(12) United States Patent
Mooney et al.

(10) Patent No.: US 11,729,149 B2
(45) Date of Patent: Aug. 15, 2023

(54) COORDINATED DATA OBFUSCATION

(71) Applicant: Cisco Technology, Inc., San Jose, CA (US)

(72) Inventors: Michael Shane Mooney, Geneva, AL (US); Maheshwari Dixith, Apex, NC (US); Jeffrey Owen Apcar, Willoughby (AU)

(73) Assignee: CISCO TECHNOLOGY, INC., San Jose, CA (US)

( * ) Notice: Subject to any disclaimer, the term of this patent is extended or adjusted under 35 U.S.C. 154(b) by 262 days.

(21) Appl. No.: 17/165,208

(22) Filed: Feb. 2, 2021

(65) Prior Publication Data

US 2022/0247726 A1 Aug. 4, 2022

(51) Int. Cl.
*H04L 9/40* (2022.01)
*H04L 9/06* (2006.01)

(52) U.S. Cl.
CPC ........ *H04L 63/0421* (2013.01); *H04L 9/0643* (2013.01); *H04L 2209/16* (2013.01)

(58) Field of Classification Search
CPC .................................................. H04L 63/0421
See application file for complete search history.

(56) References Cited

U.S. PATENT DOCUMENTS

| | | | |
|---|---|---|---|
| 9,798,867 B2 | 10/2017 | Krten | |
| 10,778,647 B2 | 9/2020 | Kumaran | |
| 2007/0294402 A1* | 12/2007 | Gillum | G06Q 10/109 709/225 |
| 2016/0182517 A1* | 6/2016 | Sullivan | H04L 9/14 713/171 |
| 2019/0116033 A1* | 4/2019 | Nicol | H04L 63/0421 |
| 2019/0228181 A1 | 7/2019 | Ford et al. | |
| 2019/0332784 A1 | 10/2019 | Allen et al. | |
| 2019/0354708 A1 | 11/2019 | Fisher et al. | |
| 2019/0377901 A1 | 12/2019 | Balzer et al. | |

(Continued)

OTHER PUBLICATIONS

Abt et al. Correlating Network Events and Transferring Labels in the Presence of IP Address Anonymisation 2016 12th International Conference on Network and Service Management (CNSM) (Year: 2016).*

(Continued)

*Primary Examiner* — David J Pearson
(74) *Attorney, Agent, or Firm* — Edell, Shapiro & Finnan, LLC (57) ABSTRACT

Techniques are provided herein for coordinated data obfuscation. In one example, a first network device in a network obtains, from a controller in or having communication to the network, an obfuscation parameter that is further obtained by one or more second network devices in the network. Personally Identifiable Information (PII) of the first network device has a given logical relationship to PII of the one or more second network devices. Based on the obfuscation parameter, the first network device obfuscates the PII of the first network device to generate obfuscated PII of the first network device. The obfuscated PII of the first network device has the given logical relationship to obfuscated PII of the one or more second network devices. The first network device provides the obfuscated PII of the first network device to a server configured to collect the obfuscated PII of the one or more second network devices.

19 Claims, 5 Drawing Sheets

(56) References Cited

U.S. PATENT DOCUMENTS

2020/0153616 A1\* 5/2020 Savalle .................. H04L 67/10
2020/0279055 A1   9/2020 Nambiar et al.
2020/0311304 A1\* 10/2020 Parthasarathy ..... G06F 11/3006
2021/0334406 A1\* 10/2021 Saad .................. G06F 21/6227

OTHER PUBLICATIONS

Romi Nur Ismanto et al., "Improving Security Level through Obfuscation Technique for Source Code Protection using AES Algorithm", ICCNS 2017, Nov. 24-26, 2017, 5 pages.
IBM, "Obfuscate resources", IBM Cloud Docs, last updated Apr. 29, 2020, 3 pages.
Lars George, "A Practical Guide to Data Obfuscation", DZone Database, Mar. 17, 2020, 6 pages.

\* cited by examiner

FIG.1

| 210 | 220 | 230 | 240 | 250 | 260 | 270 | 280 | 290 |
|---|---|---|---|---|---|---|---|---|
| MASTER CONTROLLER SOURCE ADDRESS | BACKUP MASTER CONTROLLER SOURCE ADDRESS | PACKET TYPE | SEQUENCE NUMBER | SALT | NETWORK ADDRESS TRANSFORMATION RANGE | OCR | BREACH NOTIFICATION | RESERVED |

COORDINATED DATA OBFUSCATION

TECHNICAL FIELD

The present disclosure relates to computer networking technology.

BACKGROUND

Personally Identifiable Information (PII) includes sensitive or confidential data. Most data containing PII that resides on a device could be available to any user with the proper credentials to access that data or that device. PII can be used for any number of illicit purposes if obtained by a bad actor.

DESCRIPTION OF EXAMPLE EMBODIMENTS

Overview

Techniques are provided for coordinated data obfuscation. In one example embodiment, a first network device in a network obtains, from a controller or other entity in or having communication to the network, an obfuscation parameter that is further obtained by one or more second network devices in the network. Personally Identifiable Information (PII) of the first network device has a given logical relationship to PII of the one or more second network devices. Based on the obfuscation parameter, the first network device obfuscates the PII of the first network device to generate obfuscated PII of the first network device. The obfuscated PII of the first network device has the given logical relationship to obfuscated PII of the one or more second network devices. The first network device provides the obfuscated PII of the first network device to a server configured to collect the obfuscated PII of the one or more second network devices.

Example Embodiments

Figure 1:
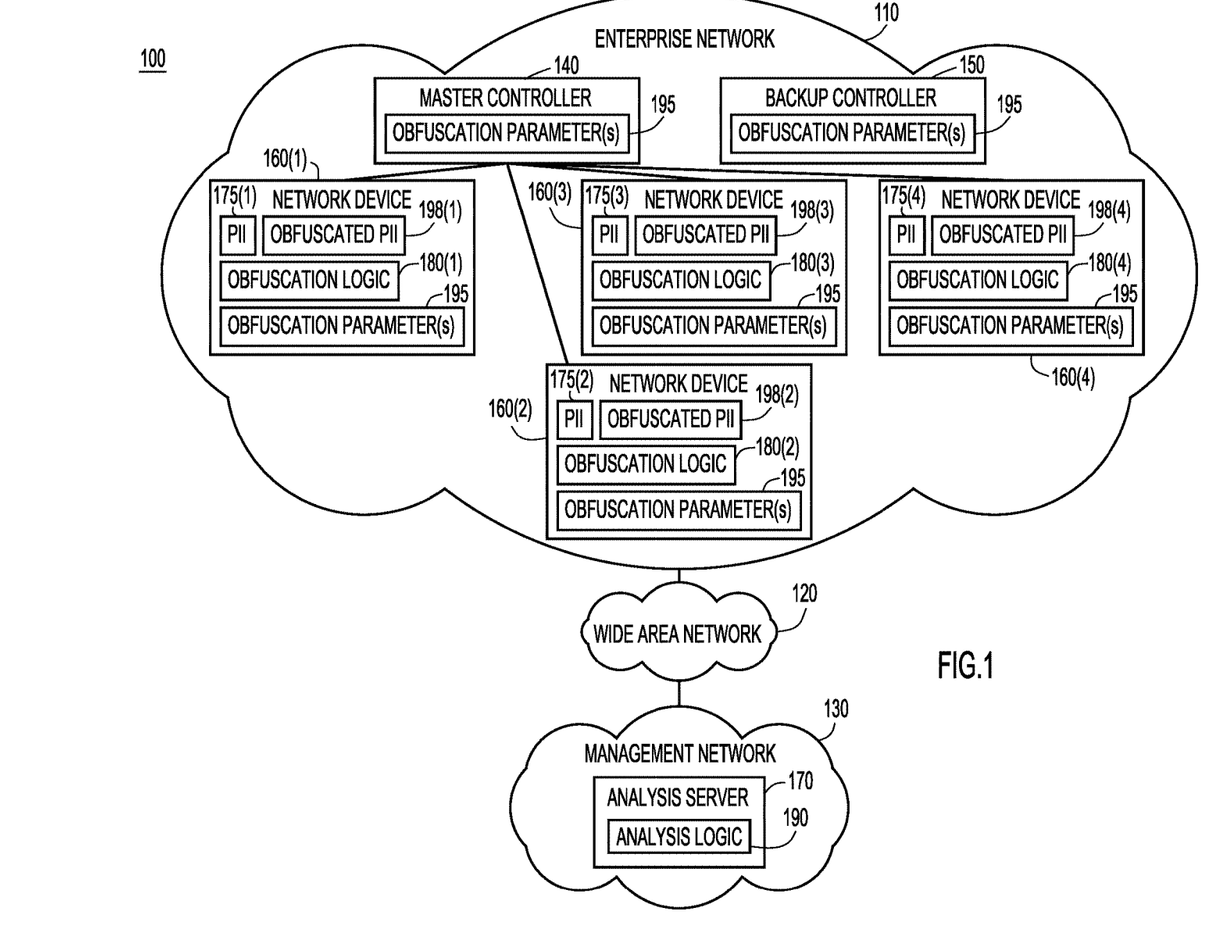
FIG. 1 illustrates a system configured for coordinated data obfuscation over a plurality of network devices, according to an example embodiment.

FIG. 1 illustrates a system 100 configured for coordinated data obfuscation. System 100 includes enterprise network 110, Wide Area Network (WAN) 120, and management network 130. Enterprise network 110 includes master controller 140, backup/standby controller 150, and network devices 160(1)-160(4). Management network 130 includes analysis server 170. Enterprise network 110 and management network 130 may be configured to communicate via WAN 120.

During the course of operation, network devices 160(1)-160(4) configure/generate/store Personally Identifiable Information (PII) 175(1)-175(4), respectively. Thus, PII 175(1) resides on network device 160(1), PII 175(2) resides on network device 160(2), PII 175(3) resides on network device 160(3), and PII 175(4) resides on network device 160(4). PII 175(1)-175(4) may be raw/unprotected data.

PII 175(1)-175(4) may include Internet Protocol (IP) addresses, host names, Media Access Control (MAC) addresses, user names, user data, etc. PII 175(1)-175(4) may be inter-related. In one example, one or more IP addresses of network devices 160(1)-160(4) may belong to the same subnet. In another example, network devices 160(1)-160(4) may be interconnected via the same Local Area Network (LAN), such as via a Layer 2 switch that connects all devices in a branch office. In that example, PII 175(1)-175(4) may include information relating to the LAN and/or the Layer 2 switch.

Management network 130 may be responsible for providing one or more services for enterprise network 110, such as monitoring network devices 160(1)-160(4). In one example, management network 130 may include a cloud system associated with a network management entity. It will be appreciated that any suitable number of network devices may be employed in accordance with the techniques described herein. For example, suitable network environments may utilize tens, hundred, or even thousands of network devices.

Analysis server 170 may be part of a network data collection system configured to collect data and/or perform network analytic services (e.g., cloud-based services) based on PII 175(1)-175(4). For example, analysis server 170 may troubleshoot issues with enterprise network 110 (or a subset thereof). Analysis server 170 may be configured to examine one or more logical relationships of network devices 160(1)-160(4), as indicated by PII 175(1)-175(4), in order to carry out the analysis.

It can be a security risk to send PII 175(1)-175(4) from enterprise network 110 to management network 130 for analysis. Because PII 175(1)-175(4) is raw/unprotected data, sending the PII 175(1)-175(4) can risk exposure of PII 175(1)-175(4) to a bad actor. However, conventional data sanitization techniques are not adequate solutions. Such techniques would involve the independent translation of PII 175(1)-175(4) to sanitized PII data. As a result, for instance, independently sanitized PII of network device 160(1) would be uncorrelated with independently sanitized PII of network devices 160(2)-160(4). From the point of view of analysis server 170, the incoming independently sanitized PII from enterprise network 110 would not be inter-related and, as such, analysis server 170 would not be able to perform network analytic services while taking into account the topology/relationships of network devices 160(1)-160(4).

Accordingly, in order to protect PII 175(1)-175(4) from bad actors while permitting analysis server 170 to derive insight into the inter-relationships between network devices 160(1)-160(4), obfuscation logic 180(1)-180(4) is provided on network devices 160(1)-160(4), respectively, and analysis logic 190 is provided on analysis server 170. Briefly, obfuscation logic 180(1)-180(4) and analysis logic 190 may provide a consistent but obfuscated view of PII 175(1)-175(4) across network devices 160(1)-160(4) for analysis server 170 to determine the relationships between network devices 160(1)-160(4) in order to evaluate the health of enterprise network 110 and suggest potential solutions.

In one example, network device 160(1) is booted up or added to enterprise network 110. PII 175(1) has a given logical relationship to PII 175(2)-175(4). Network device 160(1) determines whether it is capable of obfuscating PII 175(1). In this case, network device 160(1) is obfuscation-enabled. Network device 160(1) may further identify master controller 140. Network device 160(1) may identify master controller 140 automatically or based on manual configuration. For example, network device 160(1) may use a protocol such as the Border Gateway Protocol (BGP) to select a controller with the highest or lowest IP address to serve as master controller 140. While master controller 140 is shown in FIG. 1 to reside in enterprise network 110, in some embodiments master controller 140 may reside outside enterprise network 110.

Master controller 140 may be configured to store obfuscation parameter(s) 195 (e.g., salt, network address transformation range, etc.). Obfuscation parameter(s) 195 may include customer-specific credential(s). For example, if a given customer is associated with enterprise network 110, obfuscation parameter(s) 195 may apply to all network devices in enterprise network 110 (e.g., network devices 160(1)-160(4)). The customer may have authority over generation of obfuscation parameter(s) 195, and obfuscation parameter(s) 195 may be exchanged within enterprise network 110 in a covert/hidden/encrypted manner.

Obfuscation parameter(s) 195 may include any suitable secure hashing mechanism used for encrypted hashing of PII 175(1)-175(4). In one specific example, obfuscation parameter(s) 195 may include a salt that causes multiple network devices to generate the same text output given the same text input for each of the network devices. Obfuscation parameter(s) 195 may further include a network address transformation range (e.g., an IP address transformation range). The network address transformation range may prompt network device 160(1) to anonymize any IP addresses that might be present on network device 160(1), including but not necessarily limited to the IP address used by master controller 140 to communicate with network device 160(1). The network address transformation range may include a range that is different from the range that is actually used in enterprise network 110. For example, the network address transformation range may include a private range that is used internally (e.g., 10.0.0.0/8). If network devices 160(1)-160(4) are all aware of the network address transformation range, then the logical network (e.g., how devices in enterprise network 110 are interconnected) may remain intact using dummy addresses.

Network device 160(1) may provide a request for credentials (e.g., the salt and/or network address transformation range) to master controller 140. Master controller 140 may, in response, generate a custom synchronization packet (e.g., a beacon packet) that includes obfuscation parameter(s) 195, and send the custom synchronization packet to network device 160(1).

Master controller 140 may determine which network device(s) are obfuscation-enabled using any suitable technique. One example includes an on-demand/per-device technique, as described above in connection with network device 160(1). In another example, master controller 140 may by default send obfuscation parameter(s) 195 to all network devices in enterprise network 110 (e.g., network devices 160(1)-160(4)). In another example, master controller 140 may send obfuscation parameter(s) 195 to any network device(s) identified in a routing table. In still another example, an access control switch may be used to determine which network device(s) are obfuscation-enabled.

Network device 160(1) may obtain obfuscation parameter(s) 195 from master controller 140 on a specific, private, and secure port used for device-to-device communication and secure transmission of obfuscation parameter(s) 195 by a data obfuscation synchronization protocol in order to prevent interception. If a designated private port is used, the port may be reserved for the data obfuscation synchronization protocol. In another example, a secure tunnel may be provided between network device 160(1) and master controller 140 to allow for communication of obfuscation parameter(s) 195. Network device 160(1) may respond with a custom confirmation/acknowledgement packet to acknowledge receipt and use of obfuscation data. Based on obfuscation parameter(s) 195, network device 160(1) may obfuscate PII 175(1) to generate obfuscated PII 198(1). Network devices 160(2)-160(4) may also obtain obfuscation parameter(s) 195, and may also obfuscate PII 175(2)-175(4), respectively, to generate obfuscated PII 198(2)-198(4).

Obfuscated PII 198(1) has the same given logical relationship to obfuscated PII 198(2)-198(4) that PII 175(1) has to PII 175(2)-175(4). In other words, obfuscated PII 198(1) may be related to obfuscated PII 198(2)-198(4) in the same way that PII 175(1) is related to the PII 175(2)-175(4). Thus, for instance, the obfuscation of PII 175(1)-175(4) may maintain the same relationship between IP addresses. In one specific example, if raw (non-obfuscated) IP addresses belong to a common subnet, transformed/obfuscated IP addresses may also belong to a common subnet as per the network address transformation range.

In a further example, network device 160(1) may store a mapping of PII 175(1) to obfuscated PII 198(1). The mapping may correlate PII 175(1) with obfuscated PII 198(1). Network device 160(1) may further delete obfuscation parameter(s) 195 from network device 160(1). Thus, while obfuscation parameter(s) 195 are shown in network devices 160(1)-160(4) in FIG. 1, it will be appreciated that in certain examples network devices 160(1)-160(4) may only temporarily obtain/store obfuscation parameter(s) 195 before deleting obfuscation parameter(s) 195. This provides a high level of additional data security because obfuscation parameter(s) 195 is not stored on network device 160(1), and therefore a bad actor could not obtain obfuscation parameter(s) 195 even if the bad actor obtained access to network device 160(1). Authorized users of the appropriate super-user level may have access to the un-obfuscated device data, whereas unauthorized users may have access to the obfuscated device data but be restricted from the un-obfuscated device data. Users may be authorized based on any suitable criteria, such as biometrics, role-based access, geographic restrictions, etc.

Thus, instead of constantly obfuscating data in real-time, network device 160(1) may transform/sanitize PII 175(1) once and store the mapping of PII 175(1) and obfuscated PII 198(1) in a private, secure table. A one-time token may be used to generate obfuscated PII 198(1), which may be used (e.g., output) on-demand and for a specific purpose. Network device 160(1) receives a request for PII, network device 160(1) may reference the table and output obfuscated PII 198(1). This may also avoid the additional overhead associated with constantly running an obfuscation process to sanitize PII 175(1) repeatedly. As such, minimal additional complexity is introduced in this example. It will be appreciated that network devices 160(2)-160(4) may similarly store a mapping of PII 175(2)-175(4) to obfuscated PII 198(2)-198(4), respectively, and delete obfuscation parameter(s) 195. If a hostname (or other static PII) is to be changed (e.g., due to a configuration update of a given network device), then the encrypted hash using an obfuscation parameter may be re-run and re-stored in a PII mapping table. However, the process for IP addressing utilizing the IP address transformation range may be dynamic, and therefore may not necessarily need to be run again.

Network devices 160(1)-160(4) provide obfuscated PII 198(1)-198(4) to analysis server 170, e.g., on an on-demand or periodic basis. Analysis server 170 may be configured to collect obfuscated PII 198(1)-198(4) and perform network analytics services on obfuscated PII 198(1)-198(4) without directly accessing PII 175(1)-175(4). Analysis server 170 may generate a report (e.g., a proactive report or document, such as a troubleshooting recommendation or migration document) based on obfuscated PII 198(1)-198(4).

In a further example, network device 160(1) may identify one or more indications to provide a request for an updated obfuscation parameter. The one or more indications may suggest that obfuscation parameter(s) 195 has been compromised and that the updated obfuscation parameter is necessary or desirable for security purposes. Two examples for identifying the one or more indications are provided as follows, though it should be appreciated that any suitable indication(s) may apply to the techniques described herein.

In the first example, network device 160(1) obtains, from master controller 140, a first hash of an obfuscation parameter stored at master controller 140. Network device 160(1) generates a second hash of an obfuscation parameter stored at network device 160(1) and compares the first hash to the second hash. If network device 160(1) determines that the first hash does not match the second hash, this may indicate that obfuscation parameter(s) 195 has been compromised and the updated obfuscation parameter is necessary/desirable. Network device 160(1) may periodically (e.g., once a day) compare a local hash with a hash from master controller 140.

In the second example, network device 160(1) determines that one or more of PII 175(1) or obfuscated PII 198(1) have been accessed. For instance, network device 160(1) may determine whether the local data table storing the mapping of PII 175(1) to obfuscated PII 198(1) has been accessed or modified in an unauthorized manner (e.g., outside of the official process to refresh obfuscation parameter(s) 195). If so, this may indicate that obfuscation parameter(s) 195 has been compromised and the updated obfuscation parameter is necessary/desirable.

In response to identifying the one or more indications (e.g., determining that either of the aforementioned checks have failed), network device 160(1) may provide the request for the updated obfuscation parameter to master controller 140. In particular, network device 160(1) may send a custom breach notification packet notifying master controller 140 of a breach, and requesting that a network-wide obfuscation credential refresh be launched.

Upon receiving the request for the updated obfuscation parameter, master controller 140 may undergo a renewal process for the obfuscation credentials/parameter. Master controller 140 may generate and store the updated obfuscation parameter (e.g., a randomly generated salt). Master controller 140 may further create a custom packet with updated obfuscation parameter(s), marking the packet as an Obfuscation Credential Refresh (OCR), using a custom OCR field. Master controller 140 may create secure connections to all obfuscation-enabled devices (e.g., network devices 160(1)-160(4)) and send the obfuscation credential packet (e.g., the custom packet with the updated obfuscation parameter(s)) to network devices 160(1)-160(4) on a private, secure port (e.g., on an IP security (IPsec) tunnel).

Network device 160(1) may obtain the updated obfuscation parameter from master controller 140, remove/delete obfuscation parameter(s) 195, and insert the updated obfuscation parameter into a local protected memory space. Network device 160(1) may further remove/delete the current PII data table contents, update on-board credentials by calculating updated obfuscated PII based on the updated obfuscation parameter, and write the updated PII into the PII data table for use by network device 160(1) for subsequent data requests. Thus, based on the updated obfuscation parameter, network device 160(1) may obfuscate PII 175(1) to generate updated obfuscated PII of network device 160(1) (e.g., an updated version of obfuscated PII 198(1)). Network device 160(1) may send a custom confirmation packet to master controller 140 indicating that network device 160(1) has successfully received the updated obfuscation parameters and/or generated the updated obfuscated PII.

The aforementioned example involves network device 160(1) obtaining the updated obfuscation parameter from master controller 140. However, in certain instances, this may not be the case. For example, master controller 140 may be offline or network device 160(1) and master controller 140 may be otherwise unable to communicate with each other. In that scenario, network device 160(1) may obtain the salt and network address transformation range from other entities in enterprise network 110.

More specifically, after initiating the request for the updated obfuscation parameter(s) to master controller 140 (e.g., after sending a request for parameter(s) packet to master controller 140), network device 160(1) may determine that the updated obfuscation parameter has not been obtained from master controller 140 within a given amount of time. Upon timeout, network device 160(1) may provide the request for the updated obfuscation parameter (e.g., the request for parameters packet) to one or more of backup controller 150 or network devices 160(2)-160(4).

In response to receiving the request for the updated obfuscation parameter, backup controller 150 or network devices 160(2)-160(4) may create a secure connection to network device 160(1). In one example, network device 160(1) may accept only the first secure connection. For example, if network device 160(1) receives a request to create a secure connection from backup controller 150 and a subsequent request to create a secure connection from network device 160(2), network device 160(1) may accept only a secure connection with backup controller 150. In this example, backup controller 150 may transmit a packet including the updated obfuscation parameter(s) to network device 160(1). Network device 160(1) may thereby obtain the updated obfuscation parameter(s) from backup controller 150 (or network devices 160(2)-160(4)), and may further acknowledge receipt and use of the updated obfuscation parameter(s).

Thus, master controller 140 may not be a single source of failure. Instead, backup controller 150 may provide the updated obfuscation parameters. Network devices 160(2)-160(4) may also provide the updated obfuscation parameters if network devices 160(2)-160(4) have the updated obfuscation parameters.

As an alternative to obtaining the updated obfuscation parameter(s) from backup controller 150 and/or network devices 160(2)-160(4), network device 160(1) may continue using existing credentials until master controller 140 comes back online and sends the updated obfuscation parameter. Moreover, network device 160(1) may also send the initial request for obfuscation parameter(s) 195 to one or more of backup controller 150 or network devices 160(2)-160(4) (e.g., when network device 160(1) first comes online) upon timeout with master controller 140. As such, network device 160(1) may contact backup controller 150 and/or obfuscation-enabled neighbor devices (e.g., network devices 160(2)-160(4)) to obtain initial and/or updated sanitization credentials (e.g., salt, network address transformation range, etc.).

Thus, network device 160(1) may obtain the updated obfuscation parameter(s) from master controller 140, backup controller 150, or any of network devices 160(2)-160(4). In one example, network device 160(1) may first attempt to obtain the updated obfuscation parameter(s) from master controller 140, and then from backup controller 150, and then from any of network devices 160(2)-160(4). Network device 160(1) may obtain the updated obfuscation parameter(s) from network devices 160(2)-160(4) if obfuscation parameter(s) 195 are not deleted from network devices 160(2)-160(4). If master controller 140 and backup controller 150 are unreachable, and network device 160(1) obtains the updated obfuscation parameter(s) from multiple network devices 160(2)-160(4), network device 160(1) may utilize the updated obfuscation parameter(s) obtained from the first response received based on a sequence number in a data obfuscation synchronization protocol packet. Network device 160(1) may ignore responses from the other(s) of network devices 160(2)-160(4) until network device 160(1) sends out another request. Thus, network device 160(1) may select the updated obfuscation parameter(s) obtained from one network device of network devices 160(1)-160(4) and ignore the updated obfuscation parameter(s) subsequently obtained from the other network devices of network devices 160(1)-160(4). Network devices 160(2)-160(4) may also obtain the updated obfuscation parameter and obfuscate PII 175(1)-175(4), respectively, to generate updated obfuscated PII of network devices 160(2)-160(4). The updated obfuscated PII of network device 160(1) has the same given logical relationship to the updated obfuscated PII of network devices 160(2)-160(4) that PII 175(1) has to PII 175(2)-175(4). In other words, the updated obfuscated PII of network device 160(1) is related to the updated obfuscated PII of network devices 160(2)-160(4) in the same way that PII 175(1) is related to PII 175(2)-175(4).

Once network devices 160(1)-160(4) have acknowledged receipt and storage of the updated obfuscation parameter(s) (e.g., an updated salt and network address transformation range), and network devices 160(1)-160(4) have used the updated salt and/or network address transformation range to sanitize PII 175(1), network devices 160(1)-160(4) may output requested updated obfuscated PII to respective displays (e.g., consoles, screens, user interfaces, etc.) and/or electronically transfer the updated obfuscated PII (or any device output that uses PII 175(1)-175(4)) outside network devices 160(1)-160(4).

In one example, network devices 160(1)-160(4) may provide the updated obfuscated PII of network devices 160(1)-160(4) to analysis server 170. Analysis server 170 may be configured to collect the updated obfuscated PII of network devices 160(1)-160(4) and perform network analytics services thereon without directly accessing PII 175(1)-175(4) itself. Analysis server 170 may generate a report based on the updated obfuscated PII of network devices 160(1)-160(4).

Upon obtaining obfuscated PII 198(1)-198(4) (or updated obfuscated PII) from one or more of network devices 160(1)-160(4), analysis server 170 may use the obfuscated PII 198(1)-198(4) to create desired outputs based on analytics processes. For instance, analysis server 170 may generate a report based on PII 175(1)-175(4). In one example, analysis server 170 may obtain obfuscation parameter(s) 195 from master controller 140 and reverse-engineer obfuscated PII 198(1)-198(4) using obfuscation parameter(s) 195 to produce analytics outputs for customer consumption.

In particular, based on obfuscation parameter(s) 195, analysis server 170 may de-obfuscate obfuscated PII 198(1)-198(4) of one or more of network devices 160(1)-160(4) to recover PII 175(1)-175(4). Analysis server 170 may store the translation between obfuscated PII 198(1)-198(4) and PII 175(1)-175(4) in a lookup table and/or customer-dedicated encrypted database, and may further delete the obfuscated parameter(s). For instance, if enterprise network 110 is a classified government environment, analysis server 170 may use a one-time reverse engineering process and then delete PII 175(1)-175(4) from the encrypted database.

Analysis server 170 may further generate a report that includes PII 175(1)-175(4). In one example, analysis server 170 may generate a report based on analytics/processing of obfuscated PII 198(1)-198(4) (e.g., the report may include obfuscated PII 198(1)-198(4)). Analysis server 170 may process the report within a secure environment (e.g., management network 130) using the reverse engineering function to replace obfuscated PII 198(1)-198(4) with PII 175(1)-175(4) as a one-time function. Analysis server 170 may further create a secure PDF version of the report, and delete PII 175(1)-175(4) to prevent exposure to bad actors.

In another example, analysis server 170 may reverse-engineer obfuscated PII 198(1)-198(4) to recover PII 175(1)-175(4) and generate a report that includes PII 175(1)-175(4). In still another example, analysis server 170 may generate a report that includes obfuscated PII 198(1)-198(4), and the report may be reverse-engineered at an on-premises instance in enterprise network 110. The report may be reverse-engineered based on an encrypted database that resides at enterprise network 110, where the database stores a mapping between obfuscated PII 198(1)-198(4) and PII 175(1)-175(4). This may permit analysis of network devices 160(1)-160(4) without requiring the customer to share obfuscation parameter(s) 195 and/or PII 175(1)-175(4) outside enterprise network 110.

Once analysis server 170 has generated the report, analysis server 170 may store/upload the report on/to a customer portal. If the report includes obfuscated PII 198(1)-198(4), an automated script may utilize a translation database to transform the output into a customer-specific version that includes PII 175(1)-175(4). The automated script may reside at management network 130 or at enterprise network 110. In one example, only the customer may view items that have been uploaded to the customer portal.

Analysis server 170 may also perform obfuscation (e.g., "proxy obfuscation") on behalf of network devices that are not themselves capable of performing obfuscation (or for which it is not desired for the network devices to perform obfuscation). In other words, analysis server 170 may include an obfuscation capability to perform a sanitizing/obfuscation function on PII from network devices that are not obfuscation-capable, in a manner consistent with the rest of the environment.

In one example, analysis server 170 is to obfuscate PII 175(4) on behalf of network device 160(4). In this example, network device 160(4) may not be configured to obfuscate PII 175(4), and as such a database may indicate that network device 160(4) is incapable of performing data obfuscation.

While FIG. 1 shows network device 160(4) as obtaining obfuscation parameter(s) 195 at least temporarily, in this example network device 160(4) may not include obfuscation parameter(s) 195 because network device 160(4) is incapable of using obfuscation parameter(s) 195 for obfuscation. The database may reside on network device 160(4), master controller 140, and/or analysis server 170, for example.

Analysis server 170 may be configured to recognize and respond to packets used for synchronization of obfuscation parameter(s) 195, using master controller 140 as a source for obfuscation parameter(s) 195. Analysis server 170 may obtain obfuscation parameter(s) 195 from master controller 140, and may encrypt and store obfuscation parameter(s) 195. Analysis server 170 may further obtain PII 175(4) and, based on obfuscation parameter(s) 195, obfuscate PII 175(4) to generate obfuscated PII 198(4). In one example, analysis server 170 may further obtain obfuscated PII 198(1)-198(3) from master controller 140 and, using obfuscated PII 198(1)-198(4), generate a report.

Figure 2:
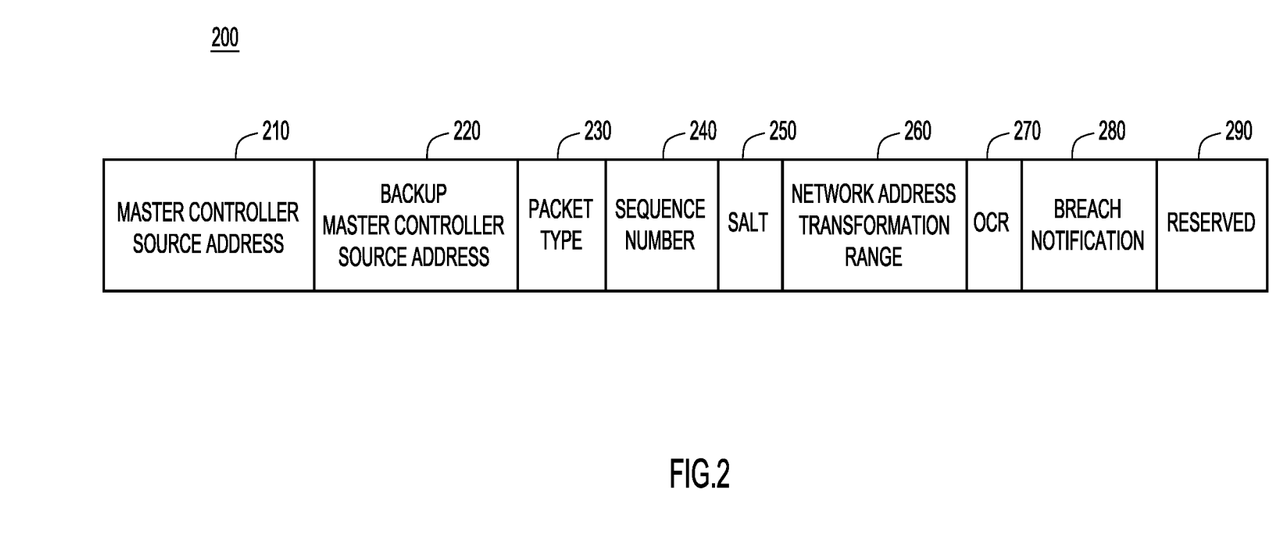
FIG. 2 illustrates a packet or message format for data obfuscation coordination over a plurality of network devices, according to an example embodiment.

With continued reference to FIG. 1, FIG. 2 illustrates an example packet or message format 200 for data obfuscation coordination. Packet format 200 includes master controller source address field 210, backup controller source address field 220, packet type field 230, sequence number field 240, salt field 250, network address transformation range field 260, OCR field 270, breach notification field 280, and reserved field 290. Master controller source address field 210 includes a network address (e.g., IP address) of master controller 140. Backup controller source address field 220 includes a network address (e.g., IP address) of backup controller 150.

Packet type field 230 indicates the type of packet that is sent. Packet type options may include initial, synchronization, reset, and acknowledgment. The initial packet type may apply to a packet sent from network device 160(1) to master controller 140 when network device 160(1) first comes online and requests obfuscation parameter(s) 195. The synchronization packet type may apply to a packet sent from master controller 140 to network device 160(1) that includes obfuscation parameter(s) 195. The reset packet type may apply to a packet sent from network device 160(1) to master controller 140 to notify master controller 140 that an out-of-cycle reset is needed/desired (e.g., due to a security breach). The acknowledgment packet type may apply to a packet sent from network device 160(1) to master controller 140 to acknowledge that network device 160(1) is successfully using obfuscation parameter(s) 195 sent by master controller 140.

Sequence number field 240 may include a sequence number used to track packet sequence. Salt field 250 may include the salt, and network address transformation range field 260 may include the network address transformation range. OCR field 270 may include a flag to indicate whether the packet includes refreshed/updated obfuscation parameters and may indicate that network device 160(1) should replace its stored parameters and re-obfuscate PII 175(1). Breach notification field 280 may include an indication that obfuscation parameter(s) 195 have been compromised to notify master controller 140 that a parameter reset is needed due to a breach. Reserved field 290 is reserved for future use, such as for additional parameters sent to/from network device 160(1).

Packet format 200 may be associated with a protocol (e.g., a data obfuscation synchronization protocol) for consistent obfuscation of identifiable data from a network device, such as network device 160(1). The protocol may operate as a self-contained mechanism for sending custom packets to coordinate synchronization between master controller 140 and all obfuscation-capable devices in enterprise network 110 (e.g., network devices 160(1)-160(4)). Special packets or messages may be used for specific functions such as notifying the controller of a breach, requesting credentials when the controller is offline, or requesting re-synchronization due to a change made to the credentials by network administrators. Thus, the protocol may be utilized to communicate data for synchronizing common obfuscation schema across all obfuscation-capable devices in enterprise network 110 (e.g., network devices 160(1)-160(4)).

Figure 3:
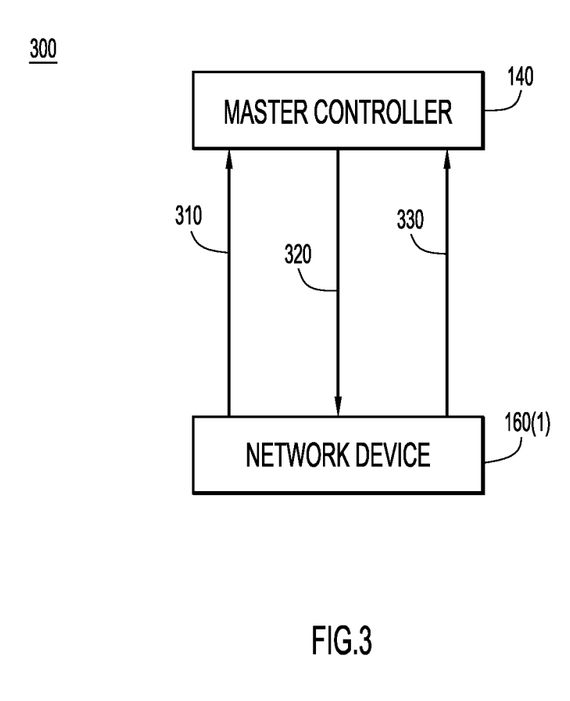
FIG. 3 illustrates a flow diagram of a method for coordinating data obfuscation over a plurality of network devices for a given network device, according to an example embodiment.

With continued reference to FIGS. 1 and 2, FIG. 3 illustrates a flow diagram 300 of a method for coordinating data obfuscation. At operation 310, network device 160(1) requests obfuscation parameter(s) 195 from master controller 140 using a packet of the initial packet type. At operation 320, network device 160(1) obtains obfuscation parameter(s) 195 from master controller 140 using a packet of the synchronization packet type. At operation 330, network device 160(1) sends an acknowledgment, to master controller 140, that network device 160(1) has obtained obfuscation parameter(s) 195 from master controller 140, using a packet of the acknowledgment packet type.

Thus, the protocol may be used to build secure connections between master controller 140 and network devices, such as network device 160(1). For example, a packet having packet format 200 may be carried in a secured transport mechanism such as an IPsec tunnel, to enable obfuscation parameters(s) 195 to remain secured and uncompromised. The protocol may be used on an as-needed basis, for periodic updating of obfuscation credentials, as a result of a security breach, when a device comes online and does not have the credentials to perform coordinated obfuscation, etc. Other embodiments may be envisioned.

Figure 4:
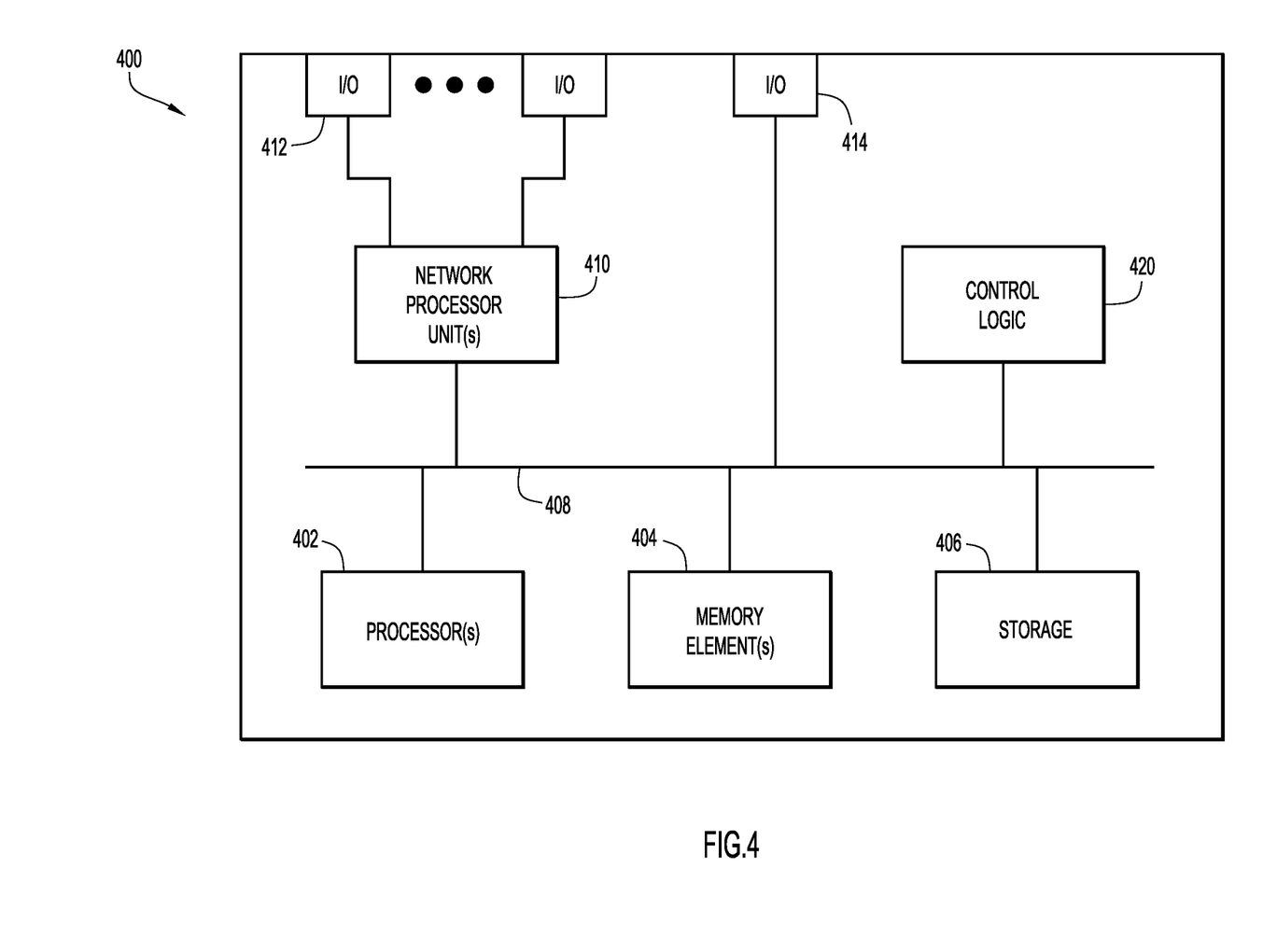
FIG. 4 illustrates a hardware block diagram of a computing device configured to perform functions associated with data obfuscation coordination operations discussed herein, according to an example embodiment.

Referring to FIG. 4, FIG. 4 illustrates a hardware block diagram of a computing device 400 that may perform functions associated with operations discussed herein in connection with the techniques depicted in FIGS. 1-3. Computing device 400 may include any of network devices 160(1)-160(4) and/or analysis server 170. In various embodiments, a computing device, such as computing device 400 or any combination of computing devices 400, may be configured as any entity/entities as discussed for the techniques depicted in connection with FIGS. 1-3 in order to perform operations of the various techniques discussed herein.

In at least one embodiment, computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory elements 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interfaces 412 may include suitable interfaces for receiving, transmitting, and/or otherwise communicating data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory elements 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 400 for transfer onto another computer readable storage medium.

Figure 5:
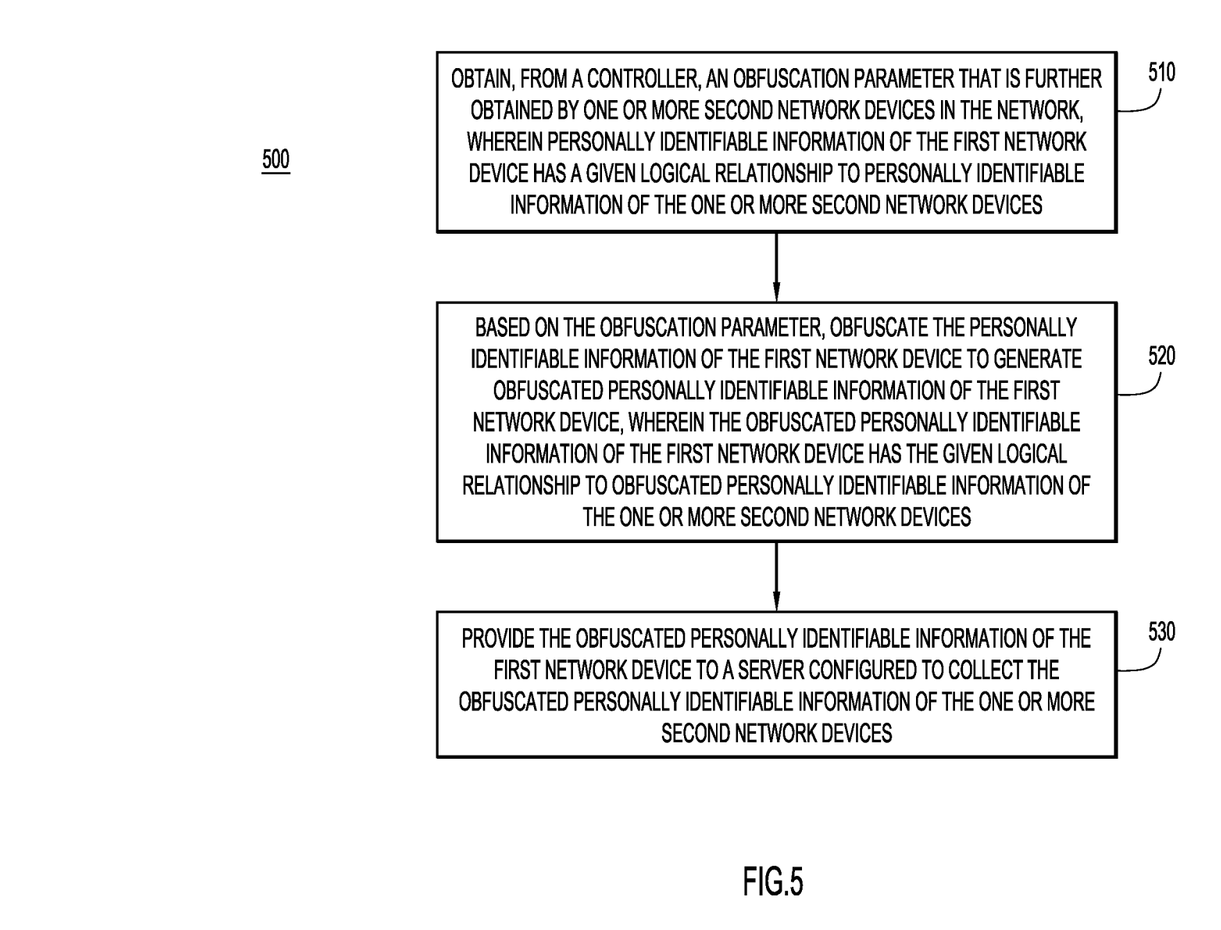
FIG. 5 illustrates a flowchart of a method for coordinating data obfuscation, according to an example embodiment.

FIG. 5 is a flowchart of an example method 500 for performing functions associated with operations discussed herein. Method 500 may be performed by any suitable entity, such as a first network device in a network (e.g., any of network devices 160(1)-160(4)). At operation 510, the first network device obtains, from a controller, an obfuscation parameter that is further obtained by one or more second network devices in the network, wherein personally identifiable information of the first network device has a given logical relationship to personally identifiable information of the one or more second network devices.

At operation 520, based on the obfuscation parameter, the first network device obfuscates the personally identifiable information of the first network device to generate obfuscated personally identifiable information of the first network device, wherein the obfuscated personally identifiable information of the first network device has the given logical relationship to obfuscated personally identifiable information of the one or more second network devices. At operation 530, the first network device provides the obfuscated personally identifiable information of the first network device to a server configured to collect the obfuscated personally identifiable information of the one or more second network devices.

As described herein, custom information may be coordinated for synchronized sanitization across all applicable network devices in a network. Thus, an analysis server may accurately, consistently, and concurrently correlate synchronized sanitized data that is output by one or more network devices in order to provide analytics and troubleshooting services. Techniques described herein may enable handling of synchronized obfuscation for device data and coordination of consistent obfuscation over an entire network. These techniques may involve synchronizing the schema for viewing transformed device data across network devices.

In one example, several common, secure data values may be used to obfuscate data from network devices for an end user in a manner that is consistent across network devices. In order to minimize the risk of exposure of PII by a bad actor, the data may be obfuscated in a manner that prevents viewing the actual PII, but allow sufficient understanding for an analysis server to complete the authorized task at hand. This may be employed, for example, in a zero-trust model.

Many capabilities may be implemented to provide network-wide obfuscation. Obfuscation parameters may be broadcast to all obfuscation-capable devices. Obfuscation-incapable devices (e.g., Internet of Things devices) may use obfuscation by proxy, whereby a server performs obfuscation on behalf of the obfuscation-incapable devices. A specified protocol may be used to transmit synchronization data between network devices and a master controller. One or more network devices may obtain credentials even if the master controller is offline. Mechanisms are also provided to determine whether a breach of credentials has occurred and to notify the master controller to send updated parameters. Obfuscation parameters may be synchronized with a collection system associated with the analysis server. Customer-specific obfuscation parameters may be used to "reverse-engineer" the analytics outputs for customer consumption.

Protocols described herein may be designed to coordinate obfuscation parameters required for sanitization. Coordination may occur in a synchronized manner across all network devices in an environment. Mechanisms are provided for devices to obtain obfuscation data from other devices in the event of an offline controller, and confirm synchronization status with the rest of the devices in the environment. The obfuscated PII may be useful to humans, Machine Learning (ML) systems, etc., because PII may be transformed in a manner that does not interfere with analytics and understanding, while non-necessary data (e.g., user names, passwords, etc.) may be redacted entirely.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: at a first network device in a network: obtaining, from a controller in or having communication to the network, an obfuscation parameter that is further obtained by one or more second network devices in the network, wherein personally identifiable information of the first network device has a given logical relationship to personally identifiable information of the one or more second network devices; based on the obfuscation parameter, obfuscating the personally identifiable information of the first network device to generate obfuscated personally identifiable information of the first network device, wherein the obfuscated personally identifiable information of the first network device has the given logical relationship to obfuscated personally identifiable information of the one or more second network devices; and providing the obfuscated personally identifiable information of the first network device to a server configured to collect the obfuscated personally identifiable information of the one or more second network devices.

In one example, the method further comprises: at the first network device in the network: storing a mapping of the personally identifiable information of the first network device to the obfuscated personally identifiable information of the first network device; and deleting the obfuscation parameter.

In one example, the method further comprises: at the first network device in the network: obtaining an updated obfuscation parameter that is further obtained by the one or more second network devices; based on the updated obfuscation parameter, obfuscating the personally identifiable information of the first network device to generate updated obfuscated personally identifiable information of the first network device, wherein the updated obfuscated personally identifiable information of the first network device has the given logical relationship to updated obfuscated personally identifiable information of the one or more second network devices; and providing the updated obfuscated personally identifiable information of the first network device to the server which is configured to collect the updated obfuscated personally identifiable information of the one or more second network devices.

In a further example, the method further comprises: at the first network device in the network: identifying one or more indications to provide a request for the updated obfuscation parameter; and in response to identifying the one or more indications, providing the request for the updated obfuscation parameter.

In a still further example, the method further comprises: at the first network device in the network: obtaining a first hash of an obfuscation parameter stored at the controller; generating a second hash of an obfuscation parameter stored at the first network device; and comparing the first hash to the second hash, wherein identifying the one or more indications to provide the request for the updated obfuscation parameter includes determining that the first hash does not match the second hash.

In another still further example, identifying the one or more indications to provide the request for the updated obfuscation parameter includes: determining that one or more of the personally identifiable information of the first network device or the obfuscated personally identifiable information of the first network device have been accessed.

In a further example, the method further comprises: at the first network device in the network: providing a request for the updated obfuscation parameter to the controller; determining that the updated obfuscation parameter has not been obtained from the controller within a given amount of time; and in response to determining that the updated obfuscation parameter has not been obtained within the given amount of time, providing the request for the updated obfuscation parameter to one or more of a backup controller or the one or more second network devices, wherein obtaining the updated obfuscation parameter includes obtaining the updated obfuscation parameter from the one or more of the backup controller or the one or more second network devices.

In a still further example, obtaining the updated obfuscation parameter from the one or more of the backup controller or the one or more second network devices includes: obtaining the updated obfuscation parameter from a network device of the one or more second network devices; and after obtaining the updated obfuscation parameter from the network device of the one or more second network devices, subsequently obtaining the updated obfuscation parameter from another network device of the one or more second network devices, the method further comprising: at the first network device in the network: selecting the updated obfuscation parameter obtained from the network device of the one or more second network devices; and ignoring the updated obfuscation parameter subsequently obtained from the other network device of the one or more second network devices.

In one example, the method further comprises: at the server: generating a report based on one or more of the obfuscated personally identifiable information of the first network device or the obfuscated personally identifiable information of the one or more second network devices.

In a further example, the method further comprises: at the server: obtaining the obfuscation parameter from the controller; and based on the obfuscation parameter, de-obfuscating the one or more of the obfuscated personally identifiable information of the first network device or the obfuscated personally identifiable information of the one or more second network devices, wherein generating the report includes generating a report that includes one or more of the personally identifiable information of the first network device or the personally identifiable information of the one or more second network devices.

In one example, the method further comprises: at the server: obtaining the obfuscation parameter from the controller; obtaining personally identifiable information of one or more third network devices in the network, wherein the personally identifiable information of the first network device has another given logical relationship to the personally identifiable information of the one or more third network devices; and based on the obfuscation parameter, obfuscating the personally identifiable information of the one or more third network devices to generate obfuscated personally identifiable information of the one or more third network devices, wherein the obfuscated personally identifiable information of the first network device has the other given logical relationship to the obfuscated personally identifiable information of the one or more third network devices.

In one example, obtaining the obfuscation parameter includes: obtaining a network packet that includes the obfuscation parameter and a network address transformation range.

In another form, an apparatus is provided. The apparatus comprises: a network interface configured to obtain or provide network communications; and one or more processors coupled to the network interface, wherein the one or more processors are configured to: obtain, from a controller in or having communication to a network, an obfuscation parameter that is further obtained by one or more network devices in the network, wherein personally identifiable information of the apparatus has a given logical relationship to personally identifiable information of the one or more network devices; based on the obfuscation parameter, obfuscate the personally identifiable information of the apparatus to generate obfuscated personally identifiable information of the apparatus, wherein the obfuscated personally identifiable information of the apparatus has the given logical relationship to obfuscated personally identifiable information of the one or more network devices; and provide the obfuscated personally identifiable information of the apparatus to a server configured to collect the obfuscated personally identifiable information of the one or more network devices.

In another form, one or more non-transitory computer readable storage media are provided. The non-transitory computer readable storage media are encoded with instructions that, when executed by a processor of a first network device in a network, cause the processor to: obtain, from a controller in or having communication to the network, an obfuscation parameter that is further obtained by one or more second network devices in the network, wherein personally identifiable information of the first network device has a given logical relationship to personally identifiable information of the one or more second network devices; based on the obfuscation parameter, obfuscate the personally identifiable information of the first network device to generate obfuscated personally identifiable information of the first network device, wherein the obfuscated personally identifiable information of the first network device has the given logical relationship to obfuscated personally identifiable information of the one or more second network devices; and provide the obfuscated personally identifiable information of the first network device to a server configured to collect the obfuscated personally identifiable information of the one or more second network devices.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:
1. A method comprising:
 at a first network device in a network:
  obtaining, from a controller in or having communication to the network, an obfuscation parameter that is further obtained by one or more second network devices in the network, wherein personally identifiable information of the first network device has a given logical relationship to personally identifiable information of the one or more second network devices;

based on the obfuscation parameter, obfuscating the personally identifiable information of the first network device to generate obfuscated personally identifiable information of the first network device, wherein the obfuscated personally identifiable information of the first network device has the given logical relationship to obfuscated personally identifiable information of the one or more second network devices;

providing the obfuscated personally identifiable information of the first network device to a server configured to collect the obfuscated personally identifiable information of the one or more second network devices;

determining that one or more of the personally identifiable information of the first network device or the obfuscated personally identifiable information of the first network device have been accessed; and in response to the determining, obtaining an updated obfuscation parameter that is further obtained by the one or more second network device.

2. The method of claim 1, further comprising:
at the first network device in the network:
storing a mapping of the personally identifiable information of the first network device to the obfuscated personally identifiable information of the first network device; and
deleting the obfuscation parameter.

3. The method of claim 1, further comprising:
at the first network device in the network:
based on the updated obfuscation parameter, obfuscating the personally identifiable information of the first network device to generate updated obfuscated personally identifiable information of the first network device, wherein the updated obfuscated personally identifiable information of the first network device has the given logical relationship to updated obfuscated personally identifiable information of the one or more second network devices; and
providing the updated obfuscated personally identifiable information of the first network device to the server which is configured to collect the updated obfuscated personally identifiable information of the one or more second network devices.

4. The method of claim 3, further comprising:
at the first network device in the network:
identifying one or more indications to provide a request for the updated obfuscation parameter; and
in response to identifying the one or more indications, providing the request for the updated obfuscation parameter.

5. The method of claim 4, further comprising:
at the first network device in the network:
obtaining a first hash of an obfuscation parameter stored at the controller;
generating a second hash of an obfuscation parameter stored at the first network device; and
comparing the first hash to the second hash, wherein identifying the one or more indications to provide the request for the updated obfuscation parameter includes determining that the first hash does not match the second hash.

6. The method of claim 3, further comprising:
at the first network device in the network:

providing a request for the updated obfuscation parameter to the controller;
determining that the updated obfuscation parameter has not been obtained from the controller within a given amount of time; and
in response to determining that the updated obfuscation parameter has not been obtained within the given amount of time, providing the request for the updated obfuscation parameter to one or more of a backup controller or the one or more second network devices, wherein
obtaining the updated obfuscation parameter includes obtaining the updated obfuscation parameter from the one or more of the backup controller or the one or more second network devices.

7. The method of claim 6, wherein obtaining the updated obfuscation parameter from the one or more of the backup controller or the one or more second network devices includes:
obtaining the updated obfuscation parameter from a network device of the one or more second network devices; and
after obtaining the updated obfuscation parameter from the network device of the one or more second network devices, subsequently obtaining the updated obfuscation parameter from another network device of the one or more second network devices, the method further comprising:
at the first network device in the network:
selecting the updated obfuscation parameter obtained from the network device of the one or more second network devices; and
ignoring the updated obfuscation parameter subsequently obtained from the other network device of the one or more second network devices.

8. The method of claim 1, further comprising:
at the server:
generating a report based on one or more of the obfuscated personally identifiable information of the first network device or the obfuscated personally identifiable information of the one or more second network devices.

9. The method of claim 8, further comprising:
at the server:
obtaining the obfuscation parameter from the controller; and
based on the obfuscation parameter, de-obfuscating the one or more of the obfuscated personally identifiable information of the first network device or the obfuscated personally identifiable information of the one or more second network devices, wherein
generating the report includes generating a report that includes one or more of the personally identifiable information of the first network device or the personally identifiable information of the one or more second network devices.

10. The method of claim 1, further comprising:
at the server:
obtaining the obfuscation parameter from the controller;
obtaining personally identifiable information of one or more third network devices in the network, wherein the personally identifiable information of the first network device has another given logical relationship to the personally identifiable information of the one or more third network devices; and based on the obfuscation parameter, obfuscating the personally identifiable information of the one or more third network devices to generate obfuscated personally identifiable information of the one or more third network devices, wherein the obfuscated personally identifiable information of the first network device has the other given logical relationship to the obfuscated personally identifiable information of the one or more third network devices.

11. The method of claim 1, wherein obtaining the obfuscation parameter includes:
obtaining a network packet that includes the obfuscation parameter and a network address transformation range.

12. An apparatus comprising:
a network interface configured to obtain or provide network communications; and
one or more processors coupled to the network interface, wherein the one or more processors are configured to:
obtain, from a controller in or having communication to a network, an obfuscation parameter that is further obtained by one or more network devices in the network, wherein personally identifiable information of the apparatus has a given logical relationship to personally identifiable information of the one or more network devices;
based on the obfuscation parameter, obfuscate the personally identifiable information of the apparatus to generate obfuscated personally identifiable information of the apparatus, wherein the obfuscated personally identifiable information of the apparatus has the given logical relationship to obfuscated personally identifiable information of the one or more network devices;
provide the obfuscated personally identifiable information of the apparatus to a server configured to collect the obfuscated personally identifiable information of the one or more network devices;
determine that one or more of the personally identifiable information of the first network device or the obfuscated personally identifiable information of the first network device have been accessed; and
in response to determining that one or more of the personally identifiable information of the first network device or the obfuscated personally identifiable information of the first network device have been accessed, obtain an updated obfuscation parameter that is further obtained by the one or more second network device.

13. The apparatus of claim 12, wherein the one or more processors are further configured to:
store a mapping of the personally identifiable information of the apparatus to the obfuscated personally identifiable information of the apparatus; and
delete the obfuscation parameter.

14. The apparatus of claim 12, wherein the one or more processors are further configured to:
based on the updated obfuscation parameter, obfuscate the personally identifiable information of the apparatus to generate updated obfuscated personally identifiable information of the apparatus, wherein the updated obfuscated personally identifiable information of the apparatus has the given logical relationship to updated obfuscated personally identifiable information of the one or more network devices; and
provide the updated obfuscated personally identifiable information of the apparatus to the server which is configured to collect the updated obfuscated personally identifiable information of the one or more network devices.

15. The apparatus of claim 14, wherein the one or more processors are further configured to:
identify one or more indications to provide a request for the updated obfuscation parameter; and
in response to identifying the one or more indications, provide the request for the updated obfuscation parameter.

16. The apparatus of claim 14, wherein the one or more processors are further configured to:
provide a request for the updated obfuscation parameter to the controller;
determine that the updated obfuscation parameter has not been obtained from the controller within a given amount of time;
in response to determining that the updated obfuscation parameter has not been obtained within the given amount of time, provide the request for the updated obfuscation parameter to one or more of a backup controller or the one or more network devices; and
obtain the updated obfuscation parameter from the one or more of the backup controller or the one or more network devices.

17. One or more non-transitory computer readable storage media encoded with instructions that, when executed by a processor of a first network device in a network, cause the processor to:
obtain, from a controller in or having communication to the network, an obfuscation parameter that is further obtained by one or more second network devices in the network, wherein personally identifiable information of the first network device has a given logical relationship to personally identifiable information of the one or more second network devices;
based on the obfuscation parameter, obfuscate the personally identifiable information of the first network device to generate obfuscated personally identifiable information of the first network device, wherein the obfuscated personally identifiable information of the first network device has the given logical relationship to obfuscated personally identifiable information of the one or more second network devices;
provide the obfuscated personally identifiable information of the first network device to a server configured to collect the obfuscated personally identifiable information of the one or more second network devices;
determine that one or more of the personally identifiable information of the first network device or the obfuscated personally identifiable information of the first network device have been accessed; and
in response to determining that one or more of the personally identifiable information of the first network device or the obfuscated personally identifiable information of the first network device have been accessed, obtain an updated obfuscation parameter that is further obtained by the one or more second network device.

18. The one or more non-transitory computer readable storage media of claim 17, wherein the instructions further cause the processor to:
store a mapping of the personally identifiable information of the first network device to the obfuscated personally identifiable information of the first network device; and
delete the obfuscation parameter.

19. The one or more non-transitory computer readable storage media of claim 17, wherein the instructions further cause the processor to:
- based on the updated obfuscation parameter, obfuscate the personally identifiable information of the first network device to generate updated obfuscated personally identifiable information of the first network device, wherein the updated obfuscated personally identifiable information of the first network device has the given logical relationship to updated obfuscated personally identifiable information of the one or more second network devices; and
- provide the updated obfuscated personally identifiable information of the first network device to the server which is configured to collect the updated obfuscated personally identifiable information of the one or more second network devices.

\* \* \* \* \*